(12) United States Patent
Ham et al.

(10) Patent No.: US 7,831,709 B1
(45) Date of Patent: Nov. 9, 2010

(54) FLEXIBLE GROUPING FOR PORT ANALYSIS

(75) Inventors: David M. Ham, Asburn, VA (US);
Shane A. Lobo, Orlando, FL (US); Steve D. Parrott, Clifton, VA (US); Drew A. Shinholster, Jr., Maitland, FL (US); Todd M. Szymanski, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 306 days.

(21) Appl. No.: 12/036,289

(22) Filed: Feb. 24, 2008

(51) Int. Cl.
*G06F 15/173* (2006.01)

(52) U.S. Cl. .................. 709/224; 370/229; 370/328; 370/389; 370/293

(58) Field of Classification Search .................. 709/220, 709/224; 370/229, 328, 389, 293
See application file for complete search history.

(56) References Cited

U.S. PATENT DOCUMENTS

| | | |
|---|---|---|
| 6,570,867 B1 | 5/2003 | Robinson et al. |
| 6,792,273 B1 | 9/2004 | Tellinger et al. |
| 6,813,634 B1 | 11/2004 | Ahmed |
| 6,973,042 B1 | 12/2005 | Fitzgerald |
| 6,978,223 B2 | 12/2005 | Milliken |
| 7,099,912 B2 | 8/2006 | Ishizaki et al. |
| 7,110,362 B2 | 9/2006 | Kato |
| 7,143,152 B1 | 11/2006 | Elman |
| 7,376,719 B1 * | 5/2008 | Shafer et al. ................. 709/220 |
| 7,376,864 B1 | 5/2008 | Hu et al. |
| 7,424,526 B1 | 9/2008 | Hansen et al. |
| 7,467,225 B2 | 12/2008 | Anerousis et al. |
| 2002/0078232 A1 | 6/2002 | Simpson et al. |
| 2002/0087393 A1 | 7/2002 | Philonenko |
| 2002/0103921 A1 | 8/2002 | Nair et al. |
| 2002/0164007 A1 * | 11/2002 | Henits ................... 379/207.02 |
| 2002/0181047 A1 | 12/2002 | Lauder et al. |
| 2003/0055972 A1 | 3/2003 | Fuller et al. |
| 2004/0064581 A1 | 4/2004 | Shitama et al. |
| 2004/0071164 A1 | 4/2004 | Baum |
| 2005/0240835 A1 | 10/2005 | Dragnea et al. |
| 2006/0215577 A1 | 9/2006 | Guichard et al. |
| 2006/0268740 A1 | 11/2006 | Rosenberg et al. |
| 2007/0041554 A1 | 2/2007 | Newman et al. |
| 2007/0250625 A1 | 10/2007 | Titus |
| 2007/0274285 A1 * | 11/2007 | Werber et al. ............... 370/351 |

OTHER PUBLICATIONS

Gonzalez, Jose, et al., "Integrated Network and Customer Database", U.S. Appl. No. 11/551,704, filed Oct. 21, 2006.

Gonzalez, Jose, et al., "Customer Link Diversity Monitoring", U.S. Appl. No. 11/620,140, filed Jan. 5, 2007.

(Continued)

*Primary Examiner*—Wing F Chan
*Assistant Examiner*—Benjamin M Thieu

(57) ABSTRACT

Computer implemented methods and systems are provided for flexible grouping for port analysis. Router configurations are parsed to create port data for each port on each router in a service provider network. The port data is integrated with customer data to create an integrated database. A plurality of ports is assigned to a plurality of groups in the integrated database based on applying a set of user defined rules, wherein at least one of the plurality of ports is assigned to multiple groups. Port data and customer data associated with a group selected from the plurality of groups is displayed.

21 Claims, 8 Drawing Sheets

OTHER PUBLICATIONS

Gonzalez, Jose, et al., "Network Access and Quality of Service Troubleshooting", U.S. Appl. No. 11/838,175, filed Aug. 13, 2007.
Office Action dated Mar. 2, 2009, U.S. Appl. No. 11/551,704, filed Oct. 21, 2006, 16 pages.
Office Action dated Jun. 15, 2009, U.S. Appl. No. 11/620,140, filed Jan. 5, 2007, 16 pages.
Office Action dated Apr. 3, 2009, U.S. Appl. No. 11/838,175, filed Aug. 13, 2007, 14 pages.
Final Office Action dated Aug. 13, 2009, U.S. Appl. No. 11/551,704, filed Oct. 21, 2006, 22 pages.
Office Action (Advisory Action) dated Oct. 16, 2009, U.S. Appl. No. 11/551,704, filed Oct. 21, 2006, 3 pages.
Final Office Action dated Nov. 27, 2009, U.S. Appl. No. 11/620,140, filed Jan. 5, 2007, 17 pages.
Final Office Action dated Nov. 24, 2009, U.S. Appl. No. 11/838,175, filed Aug. 13, 2007, 14 pages.
Office Action dated Dec. 31, 2009, U.S. Appl. No. 11/551,704, filed Oct. 21, 2006, 30 pages.
Advisory Action dated Feb. 17, 2010, U.S. Appl. No. 11/620,140, filed Jan. 5, 2007, 3 pages.
Notice of Allowance dated Mar. 22, 2010, U.S. Appl. No. 11/620,140, filed Jan. 5, 2007, 10 pages.
Advisory Action dated Mar. 24, 2010, U.S. Appl. No. 11/838,175, filed Aug. 13, 2007, 3 pages.
Office Action dated May 20, 2010, U.S. Appl. No. 11/551,704, filed Oct. 21, 2006, 33 pages.

* cited by examiner

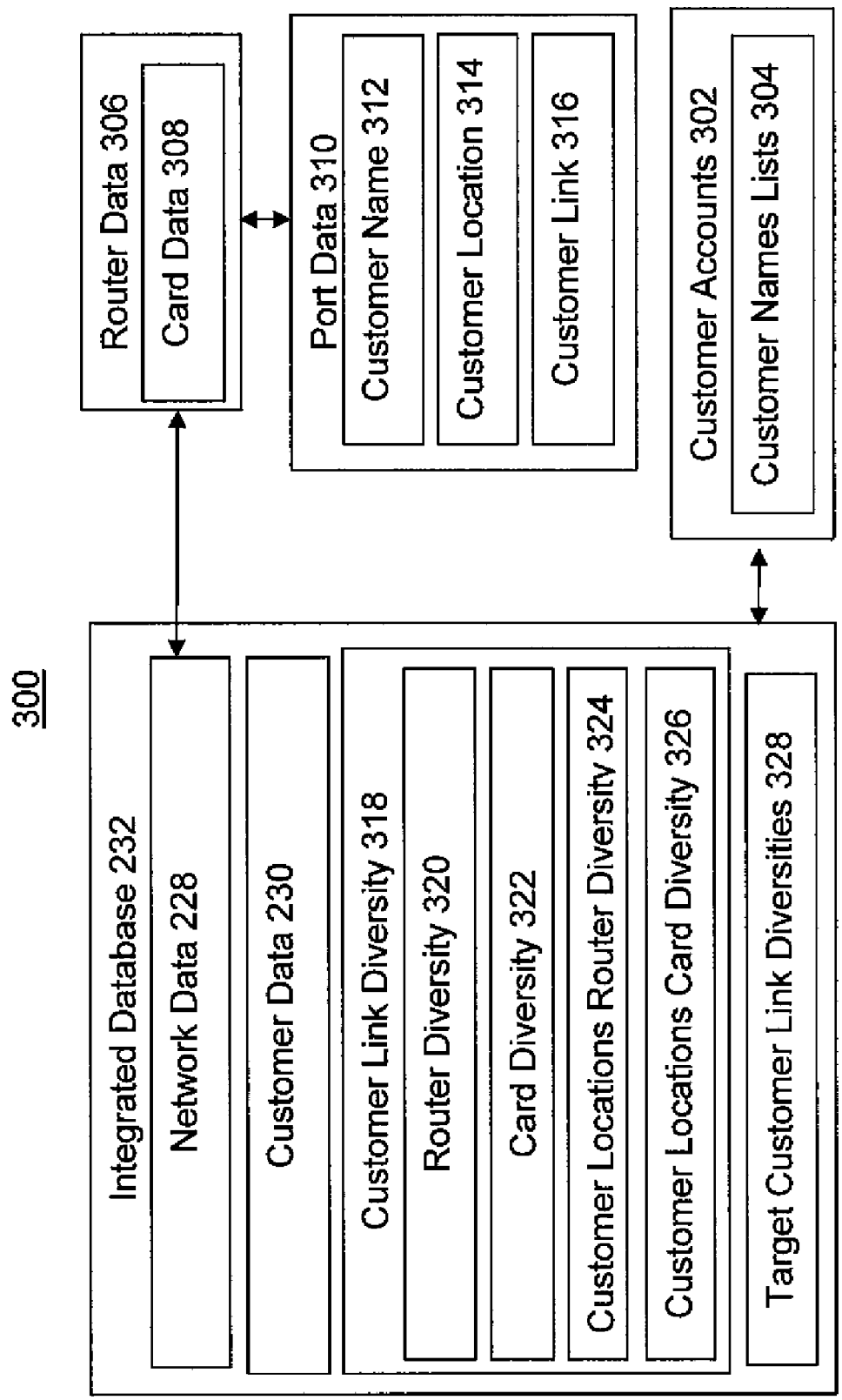

Group name 402
Description 404
Group attributes 406:
☐ All ports for a specific customer 408
☐ Make this a locked group 410
☐ Show diversity analysis 412
Rule Creation Form 414          Display bulk input form 416
Port(s) 418   must 420                           value 422
Create group 424

| Rule Listing | | | | |
|---|---|---|---|---|
| Select all 502 Delete selected rules 504 | | | | |
| Rule Type 506 | Logic 508 | Value 510 | Exclude matches 512 | Number of Ports 514 |
| ☐ Remote Autonomous System Number 516 | | | | |
| ☐ Customer Full Name 518 | | | | |
| ☐ First Private Line Number 520 | | | | |
| ☐ Second Private Line Number 522 | | | | |
| ☐ Third Private Line Number 524 | | | | |

Favorite Port Groups
Create a new port group 602   Find other groups 604
☐Select All 606   ☐Remove 608   ☐Disable e-mails 610   ☐Enable e-mails 612

| Group Name 614 | Notify 616 | List ports 618 | Edit group 620 |
|---|---|---|---|
| ☐ Great Corp. 622 | | | |
| ☐ Great Corp manufacturing center 624 | | | |
| ☐ Great Corp manufacturing computers 626 | | | |
| ☐ Great Corp distribution center 628 | | | |
| ☐ Great Corp distribution computers 630 | | | |
| ☐ Great Corp sales center 632 | | | |

Rules Listing 702
Router diversity 704   Card diversity 706   Locations router diversity 708   Locations card diversity 710
Exclude selected ports 712   Show private lines 714   Show routers 716

| Status 718 | Product 720 | Name 722 | Node 724 | Interface 726 | Bandwidth 728 | Configuration 730 | IP Address 732 |
|---|---|---|---|---|---|---|---|
| | | | | | | | |
| | | | | | | | |
| | | | | | | | |

US 7,831,709 B1

FLEXIBLE GROUPING FOR PORT ANALYSIS

CROSS-REFERENCE TO RELATED APPLICATIONS

This application includes subject matter related to the following applications, which are hereby incorporated by reference: U.S. patent application Ser. No. 11/551,704, filed Oct. 21, 2006, entitled "Integrated Network and Customer Database," by Jose Gonzalez, et al.; U.S. patent application Ser. No. 11/620,140, filed Jan. 5, 2007, entitled "Customer Link Diversity Monitoring," by Jose Gonzalez, et al.; and U.S. patent application Ser. No. 11/838,175, filed Aug. 13, 2007, entitled "Network Access and Quality of Service Troubleshooting," by Jose Gonzalez, et al.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A network service provider may monitor the status of network devices through a network monitoring system that includes network data for network devices. A customer may use computers at a specific location for a specific purpose, such as communicating with the customer's other manufacturing centers and distribution centers. The network monitoring system may not have customer data that would enable a technician to monitor the operation of network devices that provide service to the customer or to evaluate the effect of the network devices on communication with the customer's other manufacturing centers and distribution centers.

SUMMARY

In some embodiments, computer implemented methods are provided for flexible grouping for port analysis. Router configurations are parsed to create port data for each port on each router in a service provider network. The port data is integrated with customer data to create an integrated database. A plurality of ports is assigned to a plurality of groups in the integrated database based on applying a set of user defined rules, wherein at least one of the plurality of ports is assigned to multiple groups. Port data and customer data associated with a group selected from the plurality of groups is displayed.

In some system embodiments, a system having a data retriever, a database manager, and a user interface is provided. The data retriever retrieves router configurations from data stores for routers in a service provider network. The database manager parses the router configurations to create port data for each port on each router in the service provider network. The database manager also integrates the port data with customer data to create an integrated database. Additionally, the database manager assigns a plurality of ports to a plurality of groups in the integrated database based on applying a set of user defined rules, wherein at least one of the plurality of ports is assigned to multiple groups. The user interface displays port data and customer data associated with a group selected from the plurality of groups.

In some method embodiments, router configurations are parsed to determine port data for each port on each router in a service provider network. The port data is integrated with customer data to create an integrated database. A plurality of ports is assigned to a plurality of groups in the integrated database based on applying a set of user defined rules, wherein at least one of the plurality of ports is assigned to multiple groups. A customer link diversity is determined for a group selected from the plurality of groups based on the integrated database. The customer link diversity is displayed.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 3 shows a schema for an integrated database for flexible grouping for port analysis according to some embodiments of the present disclosure.

FIG. 4 shows a frame of a graphical user interface for flexible grouping for port analysis according to some embodiments of the present disclosure.

FIG. 5 shows a frame of another graphical user interface for flexible grouping for port analysis according to some embodiments of the present disclosure.

FIG. 6 shows a frame of yet another graphical user interface for flexible grouping for port analysis according to some embodiments of the present disclosure.

FIG. 7 shows a frame of an additional graphical user interface for flexible grouping for port analysis according to some embodiments of the present disclosure.

DETAILED DESCRIPTION

Figure 1:
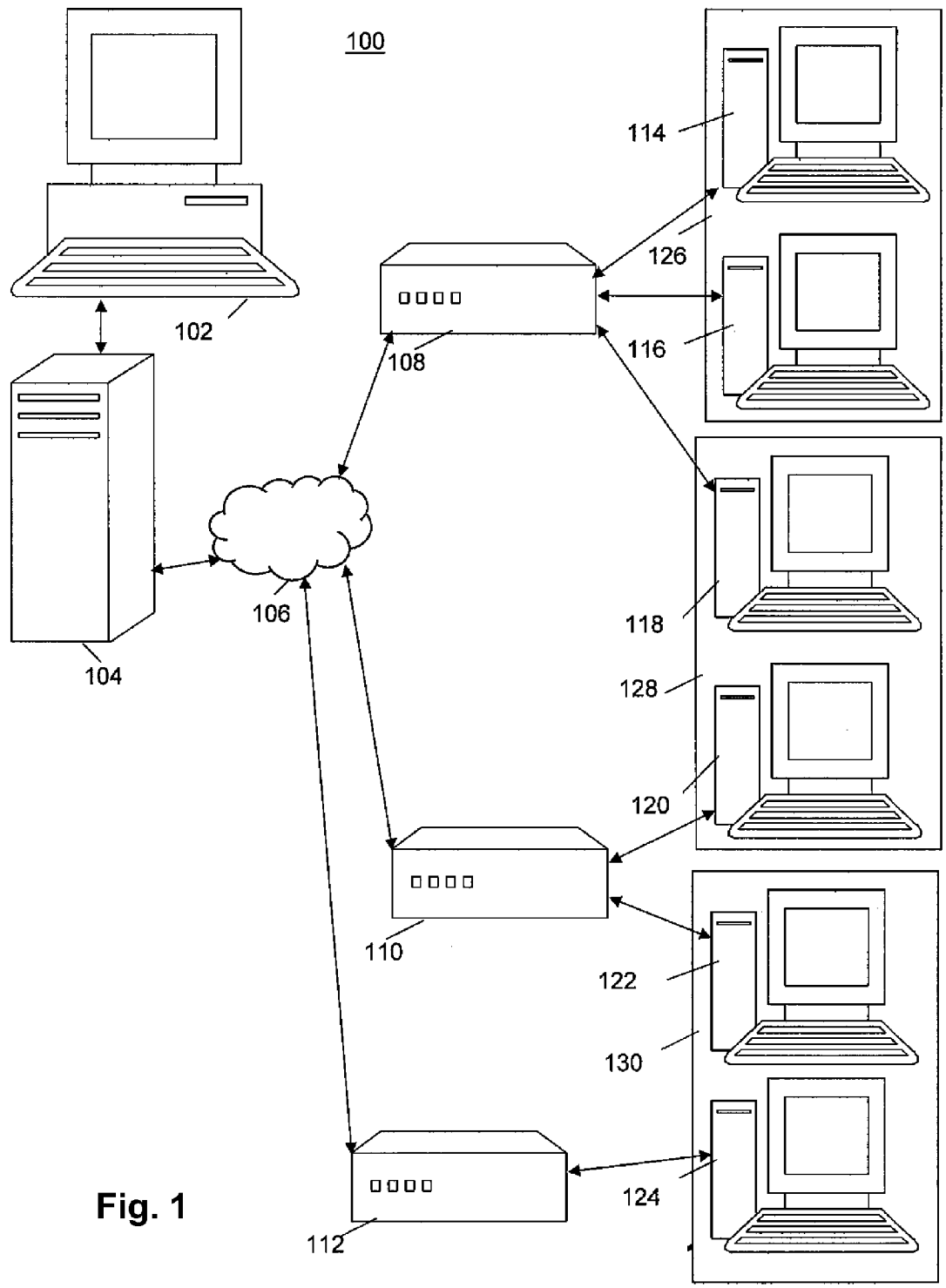
FIG. 1 shows an illustrative system for flexible grouping for port analysis.

It should be understood at the outset that although implementations of various embodiments of the present disclosure are described below, the present system may be implemented using any number of techniques, whether currently known or in existence. The present disclosure should in no way be limited to the implementations, drawings, and techniques described below, but may be modified within the scope of the appended claims along with their full scope of equivalents.

A monitoring system providing flexible grouping for port analysis is provided to enable a user to monitor the service provider network based on multiple groupings of customer links simultaneously. A port is the physical interface between a router and a circuit or cable. A customer link is the collection of all the circuits and ports that are between two end points that enable communication between those end points. For many instances, a customer link comprises a single circuit and a single port. However, some network services may bundle two or more smaller circuits to create a larger virtual circuit. These bundles can be associated with two or more ports. All of the ports providing a bundled service may be located on the same router card. The monitoring system determines which ports provide a bundled service and treats those ports accordingly. The monitoring system also allocates every port into customer links.

The monitoring system retrieves router configurations to create an integrated database. The monitoring system accesses network information in router configurations instead of directly accessing routers, thus eliminating the possibility of interfering with router operation. After the monitoring system retrieves the network information from the router configuration, the system integrates the network information with customer information to create an integrated database for subsequent access. The monitoring system associates ports with groups in the integrated database based on applying a set of user defined rules, such that some of the ports are associated with multiple groups. The rules are parsed or processed by the monitoring system when the rules are defined, for example creating a definition of a new port group, as well as when customer and/or network data changes. In an exemplary system, customer and/or network data may change several times per day, which makes the port grouping dynamic in character. In an embodiment, the monitoring system provides automatic notification to users when the content of port groups changes. The automatic notification feature promotes a responsible administrator, operator, or other human being verifying that the rule processing was done correctly.

The monitoring system provides a variety of options to the user to enable the user to define the rules for the groups of ports. The user defined rules may be based on network information, customer information, or a combination of network information and customer information. In one example, a supervisor of a network service provider account with a customer defines rules to assign all of the customer's ports to an overall group. In another example, a technician who supports one of the customer's locations defines rules to assign the customer's ports at that location to a location group. In yet another example, a salesman who sold ports to the customer, to enable the customer to create a specialized customer network between different locations, defines rules to assign the customer's specialized network ports to a network group. Some of the customer's ports may be assigned to multiple groups. The monitoring system displays port data and customer data associated with any selected groups. For example, while the system provides port data for a port to the overall group, the system also provides the same port data for the same port to the network group.

This flexible grouping enables multiple system users to simultaneously monitor user-defined groups of the customer's ports based on the different monitoring needs of each user. Each user may share their created groups with other users, enable other users to edit some of the groups created by the user, and disable other users from editing other groups created by the user. The sharing and editing functions enable users to provide monitoring capabilities to other users and receive monitoring capabilities from the other users. If another user modifies the rules for a group of ports or adds a port for the group of ports, the system may notify all users who requested any such notification, thereby updating all interested users.

The system also may determine a customer link diversity for each of the groups. Customer link diversity is an indication of how much of the customer's communication service is concentrated on a limited number of hardware components. A greater concentration of a customer's communication service on a limited number of hardware components is associated with a higher probability that a hardware failure will impact the customer's communication service. For example, a customer link diversity can indicate if a large percentage of connections for a customer are to any single router, such that the failure of that one router can cause a large number of connections to fail for the customer. The system may calculate the customer link diversity for each of the groups based on the integrated database and display the customer link diversities. For example, the system may calculate customer link diversities for the groups defined by the supervisor, the technician, and the salesman based on the ports in each group, where some of the groups may include some of the same ports. Each group of ports may have different customer link diversities. Each customer can specify target levels of customer link diversities for any group of ports, and the monitoring system can recommend reassignment of one or more customer links to increase any customer link diversity for a group of ports when the customer link diversity for the group of ports is less than its corresponding target customer link diversity. Each time that a router card is added or a customer link is added, the system can recalculate any customer link diversity, which facilitates the continual maintenance of each customer link diversity above its corresponding target customer link diversity. Maintaining each customer link diversity above its target results in greater network reliability for customers, which may lead to a greater customer satisfaction, and increased market share for the network service provider that monitors customer link diversity for groups of ports.

Turning now to FIG. 1, a monitoring system 100 providing flexible grouping for port analysis is depicted. The numbers of each type of component in the system 100 are depicted in FIG. 1 for the purpose of illustration, but the system 100 can include any number of each component type. The system 100 includes a user interface 102 and a database server 104. The user interface 102 enables a user to interface with an integrated network and customer database on the database server 104. The user can input customer data into the integrated database through the user interface 102 to the database server 104 and define rules to group port data in the integrated network and customer database for port analysis.

The database server 104 also stores data retrieved by a data retriever accessing a network 106. The data retriever retrieves network data from network devices, such as a first router 108, a second router 110, and a third router 112 that communicate with the network 106. The network data can include data that identifies which routers, cards, and ports are connected to which customers at which locations. The network 106 can include thousands of routers 108-112 for routing messages between computers. The routers 108-112 are depicted in FIG. 1 as external to the network 106 for illustration purposes, but can be components within the network 106. Each router forwards data packets across the network 106 toward their destinations. For example, the first router 108 sends and receives data packets for a first manufacturing computer 114, a first distribution computer 116, and a second distribution computer 118; the second router 110 sends and receives data packets for a second manufacturing computer 120 and a first sales computer 122; and the third router 112 sends and receives data packets for a second sales computer 124.

The first manufacturing computer 114 and the first distribution computer 116 are located at a manufacturing center 126. The second distribution computer 118 and the second manufacturing computer 120 are located at a distribution center 128. Both the first sales computer 122 and the second sales computer 124 are located at a sales center 130. The manufacturing center 126 may include the first distribution computer 116 to communicate in a customer distribution network with other distribution computers, such as the second distribution computer 118 at the distribution center 128. The distribution center 128 may include the second manufacturing computer 120 to communicate in a customer manufacturing network with other manufacturing computers, such as the first manufacturing computer 114 at the manufacturing center 126. The database server 104 stores the network data with customer data to create an integrated database. The network data can include data for multiple networks, with each network including any number of routers and data for each of the routers. The network data may be compiled from router configuration data that is stored off-line in a data store as a recovery file to enable a router to recover after power outages or router maintenance. The network data may alternatively be in part compiled from the router.

Figure 2A:
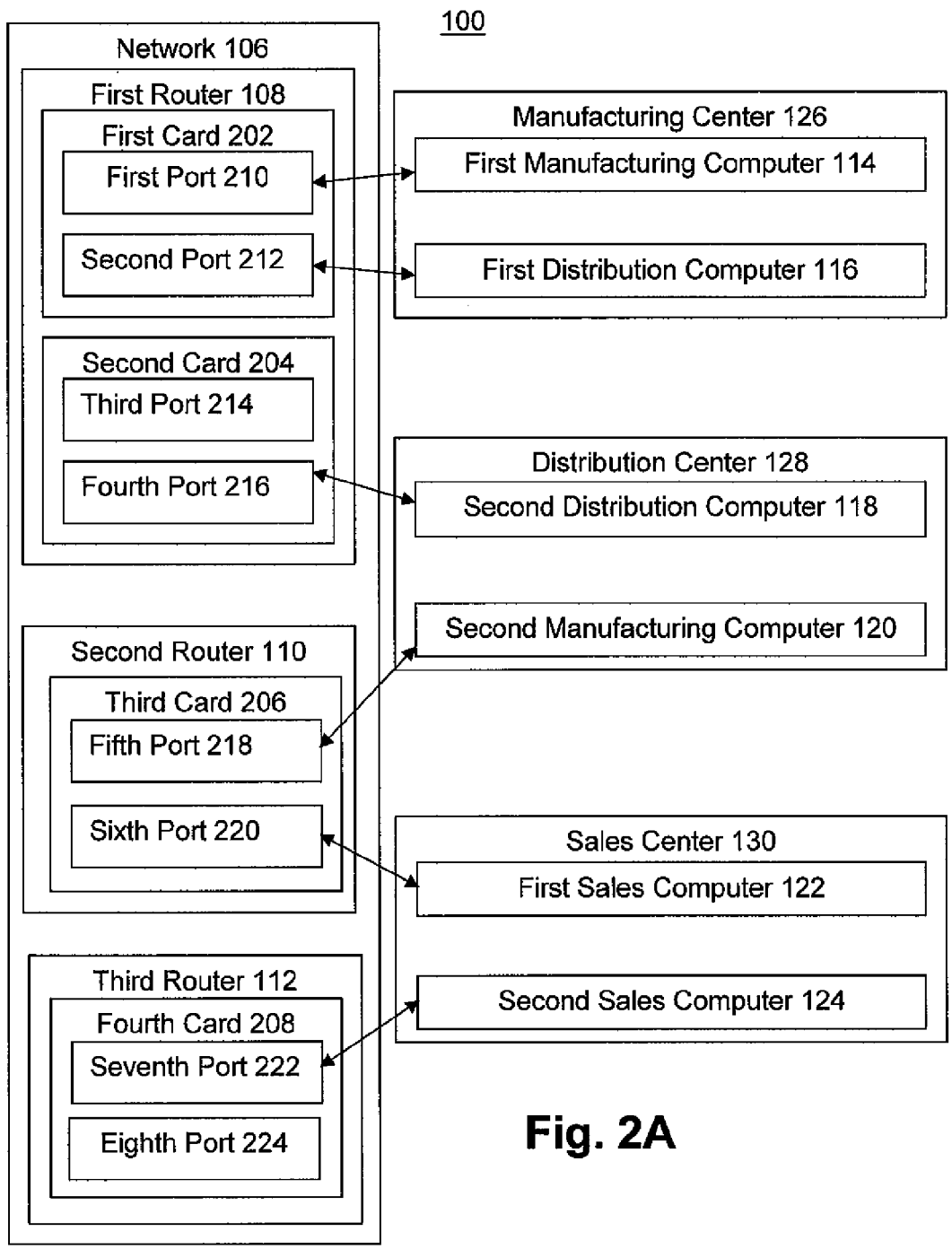
FIG. 2A shows a block diagram of an illustrative system for flexible grouping for port analysis.

Turning now to FIG. 2A, a block diagram of the system 100 promoting flexible grouping for port analysis is depicted. The numbers of each type of each component in the system 100 are depicted in FIG. 2A for the purpose of illustration, but the system 100 can include any number of each component type. The network 106 includes the first router 108, which includes a first card 202 and a second card 204, the second router 110, which includes a third card 206, and the third router 112, which includes a fourth card 208. Each card can include multiple ports that each link with a customer computer. For example, the first card 202 includes a first port 210 and a second port 212, the second card 204 includes a third port 214 and a fourth port 216, the third card 206 includes a fifth port 218 and a sixth port 220, and the fourth card 208 includes a seventh port 222 and an eighth port 224. One customer can have multiple customer computers that link to the network 106 through the routers 108-112. The manufacturing center 126 for the customer includes the first manufacturing computer 114 linked to the first port 210 on the first card 202 on the first router 108 and the first distribution computer 116 linked to the second port 212 on the first card 202 on the first router 108. Additionally, the distribution center 128 for the customer includes the second distribution computer 118 linked to the fourth port 216 on the second card 204 on the first router 108 and the second manufacturing computer 120 linked to the fifth port 218 on the third card 206 on the second router 110. Furthermore, the sales center 130 for the customer includes the first sales computer 122 linked to the sixth port 220 on the third card 206 on the second router 110 and the second sales computer 124 linked to the seventh port 222 on the fourth card 208 on the third router 112.

Figure 2B:
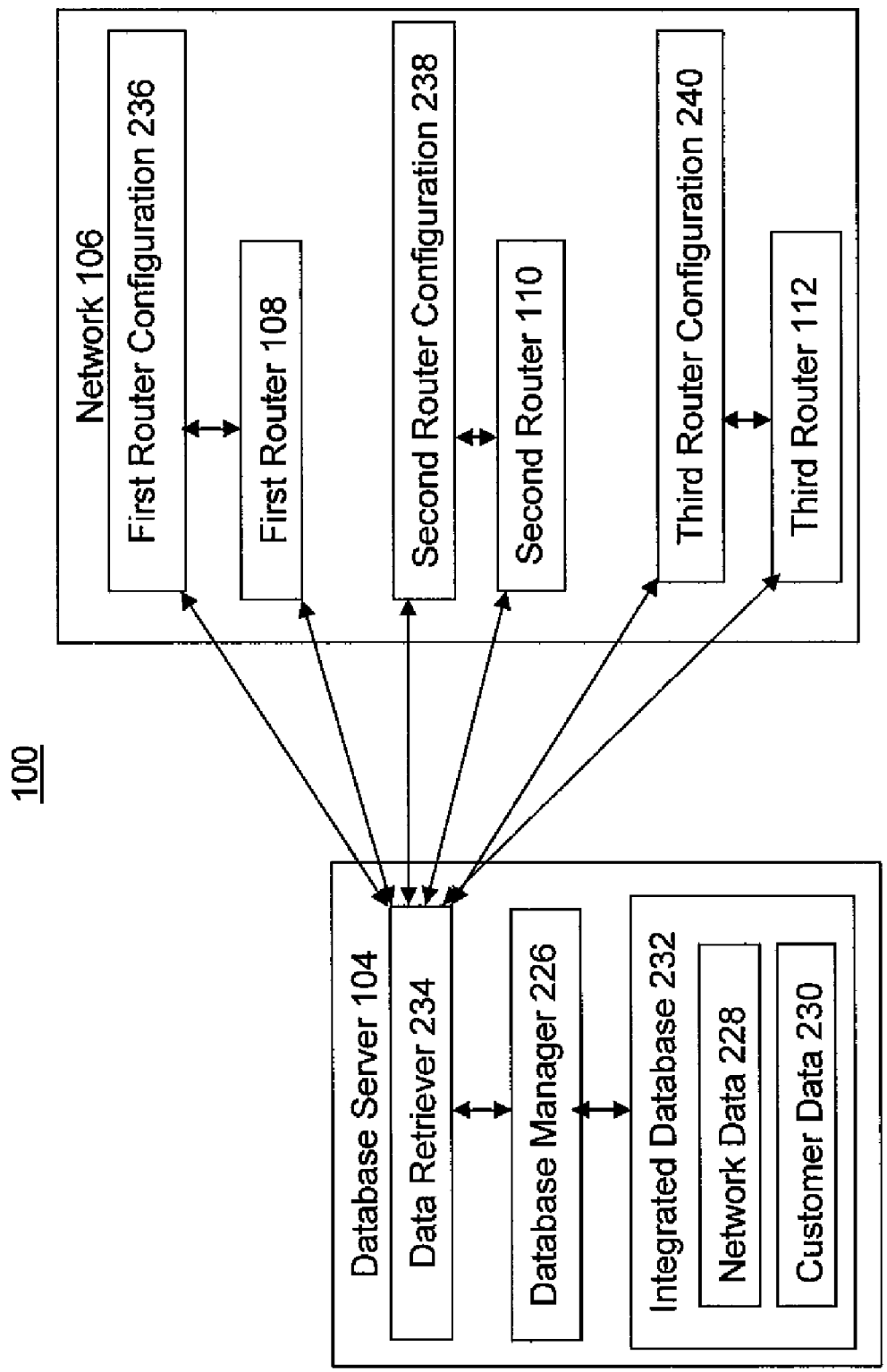
FIG. 2B shows another block diagram of a system for flexible grouping for port analysis according to some embodiments of the present disclosure.

Turning now to FIG. 2B, another block diagram of the system 100 is depicted according to some embodiments of the present disclosure. The numbers of each type of each component in the system 100 are depicted in FIG. 2B for the purpose of illustration, but the system 100 can include any number of each component type. The database server 104 can include a database manager 226 that integrates network data 228 with customer data 230 to create an integrated database 232. The network data 228 includes the port data for individual ports. The database manager 226 can receive input from a user through the user interface 102 and display the network data 228 and the customer data 230 from the integrated database 232 on the user interface 102. A data retriever 234 retrieves the network data 228 from the network 106 to provide to the database manager 226 to store in the integrated database 232. Although depicted as retrieving the network data 228 from only one network, the network 106, the data retriever 234 can retrieve the network data 228 from any number of networks. Likewise, the database manager 226 can integrate the network data 228 from any number of networks with the customer data 230 to create the integrated database 232.

The network 106 can store router configuration information off-line in a backup data store for each router to enable each router to reconfigure properly following the interruption of router power, such as power outages or router maintenance. The network data 228 is compiled from the router configuration information that includes which customer computer is linked to which port on which card for which router. The router configuration information for the first router 108 can be stored in a file in non-volatile memory in a first router configuration 236. The first router configuration 236 can be a backup data store associated with or on board the router. Similarly, the router configuration information for the second router 110 can be stored in a file in non-volatile memory in a second router configuration 238. Likewise, the router configuration information for the third router 112 can be stored in a file in non-volatile memory in a third router configuration 240. By accessing router configuration information in the first router configuration 236, the second router configuration 238, and the third router configuration 240, the data retriever 234 has the option of not directly accessing the first router 108, the second router 110, or the third router 112. Not directly accessing routers reduces the possibility of interfering with router operation.

Turning now to FIG. 3, a schema 300 for the integrated database 232 for flexible grouping for port analysis is depicted according to some embodiments of the present disclosure. The integrated database 232 includes the customer data 230 and the network data 228. The customer data 230 is related to customer accounts 302 and may be a customer database that includes business information, such as billing plans, billing information, and customer names lists 304.

Each of the customer names lists 304 includes a list of one or more customer names used by a specific customer. For example, "Great Gadgets Corporation," "Great Gadgets Corp.," "Great Gadgets," and "Great Corp." may be customer names used by the customer Great Gadgets Corporation. In contrast, "Great Games Company." is a customer name used by a customer that is unrelated to Great Gadgets Corporation. The integrated database 232 uses the customer names lists 304 to integrate the network data 228 with the corresponding customer in the customer data 230. For example, the network data 228 for "Great Gadgets Corporation," "Great Gadgets Corp.," "Great Gadgets," and "Great Corp." are integrated with the customer data 230 for the customer Great Gadgets Corporation, but the network data 228 for "Great Games" is integrated with the customer data 230 for a different customer. The integrated database 232 can present customer names from the customer names lists 304 to a user through the user interface 102 to enable the user to select which customer names in the customer names lists 304 correspond to which customers.

The network data 228 includes router data 306, which includes network information, such as card data 308 for a specific router. The network data 228 can include data for multiple networks, with each network including any number of routers and data for each of the routers. The router data 306 can be based on router configuration data that is stored off-line in a data store as a recovery file to enable a router to recover after power outages or router maintenance.

The router data 306 includes the card data 308, and the card data 308 includes the port data 310, which can include connectivity information that specifies which specific ports located on specific cards are connected to which customer locations. The data retriever 234 retrieves the router data 306, which the database server 104 parses to determine the card data 308 and port data 310 related to the card data 308. Only one instance of the port data 310 is depicted for the purpose of illustration, but each card can include multiple ports and the card data 308 can be related to instances of the port data 310 for each port.

The port data 310 includes a customer name 312, a customer location 314, and a customer link 316. The integrated database 232 uses the customer name 312 for a specific port with the customer names lists 304 to determine to which customer the specific port corresponds. By determining which specific ports correspond to which customers, the database server 104 can respond to a selection through the user interface 102 of a specific group of customer ports by displaying the port data 310 for each port that corresponds to the specific customer group.

The customer location 314 can include a geographic location for a specific router, such as New York, Chicago, or Atlanta. The customer location 314 can also include the street address for a customer linked to a specific router. By relating the customer location 314 for each router to a customer, the integrated database 232 can display the router data 306 for each router related to the customer that is at a general or specific location selected through the user interface 102. For example, if a user requests port analysis for a group of ports based on a set of user defined rules that identify Atlanta as a general location and Great Gadgets Corporation as a customer, the integrated database 232 displays the router data 306 for each of Great Gadgets Corporation's routers that are located in Atlanta. Because a customer can communicate through multiple networks from the same location, the integrated database 232 can display the name of the corresponding network along with the router data 306 for each router.

The database manager 226 may parse multiple instances of the router data 306 to determine a customer link diversity 318 based on the integrated database 232. Examples of the customer link diversity 318 include router diversity 320, card diversity 322, customer locations router diversity 324, and customer locations card diversity 326. The integrated database 232 can also include target customer link diversities 328, which can include a corresponding value for each of the determined customer link diversities. The target customer link diversities 328 can be assigned by a customer or by the user of the system 100 based on the needs of each customer. Examples of the diversities 320-328 are discussed below in reference to box 820 for FIG. 8. The diversities 320-328 indicate the probability that any hardware failure will impact multiple ports. The system 100 can monitor whether the diversities 320-328 are maintained above the target customer link diversities 328. If the system determines that any of the diversities 320-328 fall below their corresponding target customer link diversities 328, the system 100 may alert a user and may recommend a corrective action to take, such as reassigning a customer link.

FIG. 4 shows a frame 400 of a graphical user interface for flexible grouping for port analysis according to some embodiments of the present disclosure. The numbers and types of each component in FIG. 4 are depicted for the purpose of an illustrative example, but the frame 400 may include any number and type of components. Additionally, the graphic user interface may contain other frames and control elements. The database server 104 may provide the frame 400 via the user interface 102 to enable a user to enter information via the components 402-424 to create a group of ports for analysis. The frame 400 includes a group name 402 field, a description 404 field, a group attributes 406 heading, an "all ports for a specific customer" 408 checkbox, a "make this a locked group" 410 checkbox, a "show diversity analysis" 412 checkbox, a rule creation form 414 heading, a display bulk input form 416 selectable button, a port(s) 418 field, a must 420 field, a value 422 field, and a create group 424 selectable button.

The group name 402 field is for entering a name for a group of ports, such as "Great Corp. manufacturing computers." The description field 404 is for adding further identifying information for the group of ports, such as "manufacturing computers located at the manufacturing center and the distribution center." The group attributes 406 heading is over the "all ports for a specific customer" 408 checkbox, the "make this a locked group" 410 checkbox, and the "show diversity analysis" 412 checkbox. Selecting the checkboxes 408-412 under the group attributes 406 heading is over information related to the group. For example, the "all ports for a specific customer" 408 checkbox is selected to specify that the ports in the group are all of the ports for a specific customer, such as the ports 210, 212, and 216-222 for "Great Corp."

The "make this a locked group" 410 checkbox is for enabling the creator of the group to specify whether the creator or a system administrator may enable other system users to edit the group or disable other system users from editing the group. For example, if a user that creates a group does not select the "make this a locked group" 410 checkbox, the user may initially enable other users to edit the group by defining additional rules that either add ports to the group or remove ports from the group. Adding ports to the group may be helpful when other users sell ports to the customer whose ports are defined by the rules for the group. However, the group creator may later disable other users from editing the group. For example, the creator may be interested only in monitoring ports that the creator sold to the customer, such that the creator may not want additional ports to be added to the group. Another user that adds a port for this group may create another group that includes the added port and the ports originally in this group.

If the "show diversity analysis" 412 checkbox is selected, the database server 104 will analyze the diversity for the group and the user interface 102 will display this diversity for the group when the group created via the frame 400 is displayed. Examples of diversity are discussed below in reference to box 820 in FIG. 8.

The rule creation form 414 heading is next to the display bulk input form 416 selectable button, the port(s) 418 field, the must 420 field, and the value 422 field. The display bulk input 416 selectable button enables a user to identify individual ports, wherein the database server 104 creates a rule that corresponds to the individual ports. For example, if a user is interested in monitoring ports that have experienced problems within the last month, the user may have difficulty in defining rules that identify these specific ports. In response to a selection of the display bulk input form 416 selectable button, the database server 104 displays an entry field for multiple ports via the user interface 102, in which the user may enter identifiers for each individual port that the user is interested in monitoring. The database server 104 responds to the bulk entry of these individual ports by creating a custom rule that identifies the ports and enables the user to name the custom rule. For example, a user may copy a list of private line numbers and network addresses from a report identifying ports with problems over the last month, and paste the list into the entry field for multiple ports.

The port(s) 418 field is an entry field that enables a user to define rules to identify ports for the group that the user is creating. The user may define the rules for ports based on a customer full name, a customer short name, a remote side internet protocol address, a network address number, a private line number, an interface description, a remote border gateway protocol autonomous system number, a router and interface name, a support office indicator code, and/or a multiprotocol label switching virtual routing and forwarding number. The customer full name is an identifier for a customer, such as Great Gadgets Corporation. The customer short name is an identifier for a sub-portion of a customer, such as the manufacturing center 126. The remote side internet protocol address identifies a connection used by the customer, such as 10.111.12.230/30. The network address number and the private line number are internal billing identifiers used by database applications, such as 530254-002 and 530179. The interface description is a text identifier stored by a router for a port, such as Great Corp. 530179. The remote border gateway protocol autonomous system number is a routing protocol number for a collection of internet protocol networks and routers under the control of one or more entities that presents a common routing policy to the internet, such as 15169. The router and interface name is an identifier for a router to a customer, such as Serial5/1/0/18.0. The support office indicator code is an identifier used by a network service provider to specify individuals responsible for the sale and/or the support of a port. The multiprotocol label switching (MPLS) virtual routing and forwarding number is a number used to distinguish traffic in a multiprotocol label switching network.

The must 420 field enables a user to define the relationship between some ports in a group and a value specified in the value 422 field. For example, if a user selects "remote border gateway protocol autonomous system number" for the port(s) 418 field, "equals" for the must 420 field, and "15169" for the value 422 field, the database server 104 uses this user defined rule to identify all ports that have a remote border gateway protocol autonomous system number that equals 15169. In another example, if a user selects "customer full name" for the port(s) 418 field, "contains" for the must 420 field, and "Great" for the value 422 field, the database server 104 uses this user defined rule to identify all ports that have a customer full name that contains "Great." The user may differentiate between "Great Gadgets Corporation" and "Great Games Company" before defining this rule or after defining this rule. In yet another example, if a user selects "private line number" for the port(s) 418 field, "equals" for the must 420 field, and "530179" for the value 422 field, the database server 104 uses this user defined rule to identify the ports that have a private line number that equals 530179. By defining rules for two private line numbers, the user may select all of the ports that serve similar functions for a customer, such as the first port 210 for the first manufacturing computer at the manufacturing center 126 and the fifth port 218 for the second manufacturing computer 120 at the distribution center 128.

The create group 424 selectable button enables a user to create a group based on user entries for the components 402-422. For example, the user may create a group with a group name 402 of "Great Corp." for the ports 210, 212, and 216-222. In another example, the user may create a group with a group name 402 of "Great Corp. manufacturing computers" for the ports 210 and 218. In yet another example, the user may create a group with a group name 402 of "Great Corp. distribution computers" for the ports 212 and 216.

FIG. 5 shows a frame 500 of another graphical user interface for flexible grouping for port analysis according to some embodiments of the present disclosure. The numbers and types of each component in FIG. 5 are illustrative, but the frame 500 may include any number and type of components. Additionally, the graphic user interface may contain other frames and control elements. The frame 500 includes components for listing rules for a group of ports, such as checkboxes for select all 502 and for delete selected rules 504. The frame may also include columns for rule type 506, logic 508, value 510, exclude matches 512, and number of ports 514. Additionally, the frame 500 may include rows for remote autonomous system number 516, customer full name 518, first private line number 520, second private line number 522, and third private line number 524. The database server 104 may provide the frame 500 via the user interface 102 to enable a user to view the rules for a group of ports via the selectable buttons 502-504, columns 506-514, and rows 516-524 and edit the rules for the group of ports.

The selectable button for select all 502 enables a user to select all of the rules listed in the rule type 506 column, which may assist a user in deleting a group. The selectable button for delete selected rules 504 enables a user to delete the selected rules listed in the rule type 506 column, which may assist a user in deleting any rules that created a group. The column for rule type 506 lists the rules applied to a group of ports, such as the rows 516-524 that specify individual rules. The column for logic 508 lists the relationship between the rules listed in the rule type 506 and the values listed in the value 510 column, such as whether the rule type 506 contains a listed value or whether the rule type 506 equals a listed value. The column for value 510 lists values related to the rules listed in the rule type 506 column, such as "Great" or "15169". The column for exclude matches 512 specifies whether the rule listed in the rule type 506 column excludes matches with the values listed in the value 510 column, rather than equaling or containing the values listed in the value 510 column. The column for number of ports 514 lists a number of ports defined by the rule listed in the rule type 506 column. For example, the row for remote autonomous system number 516 may include "equals" in the logic 508 column, "15169" in the value 510 column, "no" in the exclude matches 512 column, and "14" in the number of ports 514 column. The row 516 may indicate that 14 ports in a network have a remote autonomous system number that equals the value 15169. In another example, the row 518 may indicate that 99 ports in a network have a customer full name that includes "Great."

FIG. 6 shows a frame 600 of yet another graphical user interface for flexible grouping for port analysis according to some embodiments of the present disclosure. The numbers and types of each component in FIG. 6 are depicted for the purpose of example, but the frame 600 may include any number and type of components. Additionally, the graphic user interface may contain other frames and control elements. The database server 104 may provide the frame 600 via the user interface 102 to enable a user to review and edit a list of "favorite" groups of ports. A "favorite" group of ports is a group of ports for which the user interface 102 provides information to a user without the user explicitly requesting the information each time. For example, the user interface 102 may provide information for a group of all of Great Gadgets Corporation's ports to a supervisor who is responsible for overseeing service for all of Great Gadgets Corporation's ports. In another example, the user interface 102 may provide information for a group of Great Gadgets Corporation's ports serving manufacturing computers to a salesman who sold the ports serving manufacturing computers to Great Gadgets Corporation. The salesman's favorite groups may include both the group of all of Great Gadgets Corporation's ports and the group of Great Gadgets Corporation's ports serving manufacturing computers listed in the frame 600.

Likewise, the supervisor's favorite groups may include some of the salesman's favorite groups, as well as some additional favorite groups.

The frame 600 includes a "create a new port group" 602 selectable button, a "find other groups" 604 selectable button, a "select all" 606 checkbox, a "remove" 608 checkbox, a "disable e-mails" 610 checkbox, and an "enable e-mails" 612 checkbox. The frame 600 also includes columns for group name 614, notify 616, list ports 618, and edit group 620. Additionally, the frame 600 includes rows for Great Corp. 622, Great Corp. manufacturing center 624, Great Corp. manufacturing computers 626, Great Corp. distribution center 628, Great Corp. distribution computers 630, and Great Corp. sales center 632.

The selectable button for "create a new port group" 602 may enable a user to create a new group of ports that may be added to the user's list of favorite groups of ports. The user interface 102 may display the frame 400 in response to the user selecting the selectable button 602 for "create a new port group." The selectable button 604 for "find other groups" may enable a user to search for groups created by other users, whereby the user may add any of the groups created by other users to the user's list of favorite groups of ports. The checkbox 606 for "select all" may enable a user to select all of the groups of ports in the user's list of favorite groups of ports for an action to be specified, such as enabling or disabling e-mail notices. The checkbox 608 for "remove" may enable a user to remove a selected group of ports from the user's list of favorite groups of ports. The checkbox 610 for "disable e-mails" may enable a user to disable e-mail notifications for any selected group of ports, such that the user is not notified when additional ports are added to the network that satisfy the rules defined for the selected group of ports or when any of the rules that define the selected group of ports are modified. The checkbox for "enable e-mails" 612 may allow a user to enable e-mail notifications for any selected group of ports, such that the user is notified when additional ports are added to the network that satisfy the rules defined for the selected group of ports or when any of the rules that define the selected group of ports are modified.

The column for group name 614 lists the favorite groups for a user, such as the rows for Great Corp. 622, Great Corp. manufacturing center 624, Great Corp. manufacturing computers 626, Great Corp. distribution center 628, Great Corp. distribution computers 630, and Great Corp. sales center 632. The column for notify 616 indicates whether the user has currently enabled the database server 104 to send notifications to the user for the favorite group in the corresponding row. When the user selects the column for list ports 618, the user interface 102 responds by listing port information associated with the favorite group in the corresponding row. When the user selects the column for edit group 620, the user interface 102 responds by enabling the user to edit the rules for the favorite group in the corresponding row by displaying the frame 500.

FIG. 7 shows a frame 700 of an additional graphical user interface for flexible grouping for port analysis according to some embodiments of the present disclosure. The numbers and types of each component in FIG. 7 are depicted for the purpose of an example, but the frame 700 may include any number and type of components. Additionally, the graphic user interface may contain other frames and control elements. The database server 104 may provide the frame 700 via the user interface 102 to enable a user to view information for a group of ports. The frame 700 includes a rules listing 702 selectable button, a router diversity 704 field, a card diversity 706 field, a locations router diversity 708 field, a locations card diversity 710 field, an exclude selected ports 712 selectable button, a show private lines 714 selectable button, and a show routers 716 selectable button. The frame 700 also includes columns for status 718, product 720, name 722, node 724, interface 726, bandwidth 728, configuration 730, and IP address 732.

When a user selects the selectable button for rules listing 702, the user interface 102 responds by displaying the rules that define the group, such as the frame 500. The router diversity 704 field, the card diversity 706 field, the locations router diversity 708 field, and the locations card diversity 710 field are fields for diversities that the frame 700 may display, diversities that are discussed in reference to box 820 below. The selectable button for exclude selected ports 712 enables a user to select a port for exclusion when analyzing ports, such as when a port is added to address a problem with an existing port and the existing port is still used for analysis. When the user selects the selectable button for show private lines 714, the user interface 102 responds by displaying private line numbers for the group. When the user selects the selectable button for show routers 716, the user interface 102 responds by displaying individual router information for the group.

The column for status 718 lists the status for the ports in the corresponding rows, such as a real time port data. The data retriever 234 may retrieve the real time data for the ports in a group that is displayed via the user interface 102. The frame 700 may update the status 718 when the frame 700 is displayed and/or upon request by a user. The real time port data may include port bandwidth, status, configuration, and data output. The port bandwidth may be the actual observed bandwidth for a port, such as 56,000 bits per second, rather than a maximum possible bandwidth. The port status indicates the real time condition of the specific port, and may be listed as "up," "down," "administratively shutdown," "up with errors," and "up without passing traffic," which may be based on the other data for the port. The data output may be a measure of the data output over a time period, and may include a comparison to the bandwidth and the resulting utilization calculation.

The column for product 720 lists the product identifier for the corresponding rows, such as "SL-GMPLS." The column for name 722 lists the name for the corresponding rows, such as "Great Corp." The column for node 724 lists the node identifier for the corresponding rows, such as "sl-pe1-kc." The column for interface 726 lists the interface identifier for the corresponding rows, such as "Serial5/1/0/18.0." The column for bandwidth 728 lists the bandwidth for the corresponding rows, such as "1536 (T–1)." The column for configuration 730 lists the configuration status for the corresponding rows, such as "operational." The column for IP address 732 lists the internet protocol address for the corresponding rows, such as "10.111.19.114/30."

Figure 8:
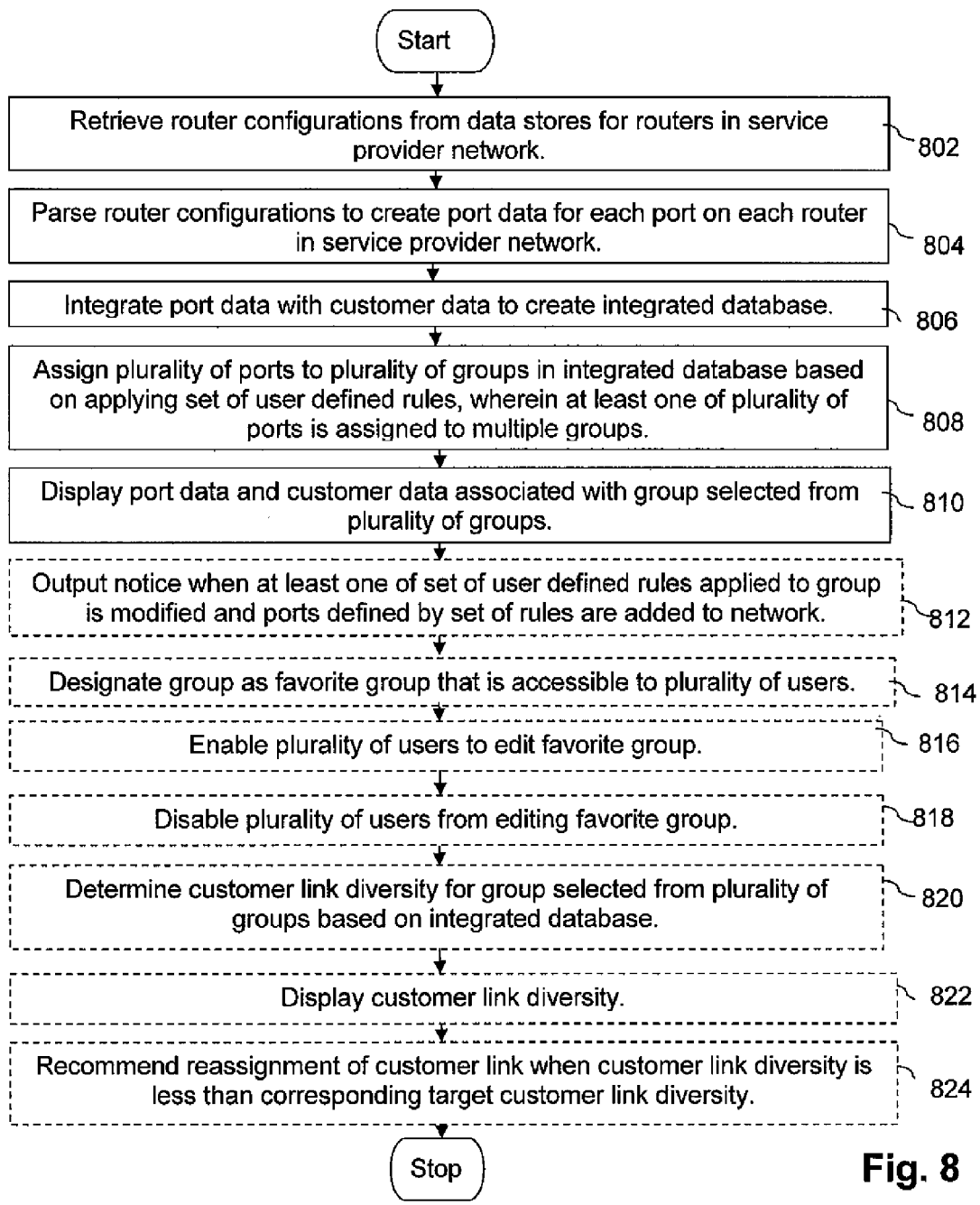
FIG. 8 shows an illustrative method for flexible grouping for port analysis according to some embodiments of the present disclosure.

Turning now to FIG. 8, an illustrative integration method for flexible grouping for port analysis is depicted according to some embodiments of the present disclosure. Executing the method results in creating a database of port data and customer data, assigning ports to groups in the database, and displaying port data and customer data associated with selected groups.

In box 802, the data retriever retrieves router configurations from data stores for routers in a service provider network. The data retriever 234 can retrieve the router configurations from off-line backup data stores for the routers so that the on-line routers are not directly accessed during normal operations. The on-line routers can store their router configurations in the off-line backup data stores periodically, such as each day when throughput is low.

In box 804, the database server parses the router configurations to determine the port data for each port on each router in the service provider network. The data retriever 234 can retrieve the router data 306 and the database server 104 can parse the router data 306 to determine the port data 310 for each port on each router. Alternatively, the data retriever 234 can retrieve the router data 306 and parse the router data 306 to determine the port data 310 for each port on each router. For example, parsing the router data 306 determines the port data 310 that specifies the customer name 312 for a port is "Great Corp." and the customer link 316 is between the first manufacturing computer 114 at the manufacturing center 126 and the first port 210 on the first card 202 on the first router 108. As another example, parsing the router data 306 can determine the customer location 314 that specifies Chicago as the geographic location for the router that contains the port and the customer link 316 is between the first distribution computer 116 at the manufacturing center 126 and the second port 212 on the first card 202 on the first router 108.

In box 806, the database server integrates the port data with the customer data to create the integrated database. The database server 104 uses the customer name 312 for each port on each router in combination with the customer names lists 304 to integrate the customer data 230 with the network data 228, which includes the port data 310. For example, the port data 310 related to the network data 228 specifies that the customer name 312 for the first port 210 is "Great Corp.," and the port data 310 related to the network data 228 specifies that the customer name 312 for the second port 212 is "Great Corp." For this example, the database server 104 integrates the port data 310 for the first port 210 and the port data 310 for the second port 212 with the customer data 230 for Great Gadgets Corporation. The database server 104 stores this integrated network data 228 and customer data 230 in the integrated database 232. The integrated database 232 can include network data 228 that is both current and historical data.

In box 808, a plurality of ports is assigned to a plurality of groups in the integrated database based on applying a set of user defined rules, wherein at least one of the plurality of ports is assigned to multiple groups. For example, the database server 104 assigns the ports 210, 212, and 216-222 to the "Great Corp." 622 group based on applying a set of the supervisor's defined rules that are based on customer data 230. In another example, the database server 104 assigns the ports 210 and 212 to the "Great Corp. manufacturing center" 624 group based on applying a set of the technician's defined rules that are based on network data 228. In yet another example, the database server 104 assigns the ports 210 and 218 to the "Great Corp. manufacturing computers" 626 group based on applying a set of the salesman's defined rules that are based on a combination of network data 228 and customer data 230. The database server 104 may apply each set of user defined rules on every occasion when the network data 228 and/or the customer data 230 changes. For example, in response to the technician adding a new port, the database server 104 applies the supervisor's defined rules to the new port to assign the new port to the "Great Corp." 622 group.

The database server 104 may assign a port to the group if each rule applies to the port or if one of the set of rules applies to the port. For example, the database server 104 assigns the ports 210 and 212 to the "Great Corp. manufacturing center" 624 group because the rule defining "Great Corp." as the name 722 and the rule defining "530254" as the private line for the manufacturing center 126 applies to the ports 210 and 212. In another example, the database server 104 assigns the ports 210 and 218 to the "Great Corp. manufacturing computers" 626 group because either the rule defining "530254-002" as the network address or the rule defining "530265-001" as the network address applies to the ports 210 and 218. The database server 104 may identify ports for exclusion from the group. For example, the database server 104 initially assigns the ports 210, 212, 216, and 218 to the "Great Corp. manufacturing computers" 626 group based on rules defining private lines for the manufacturing center 126 and the distribution center 128, but then the database server 104 excludes the ports 212 and 216 from the "Great Corp. manufacturing computers" 626 group based on rules defining the network addresses for these ports for exclusion. Exclusion rules enable a user to more easily define some groups by initially defining a larger group of ports than desired for the group and then selecting to exclude some of the ports in the larger group of ports.

In box 810, port data and customer data associated with a group selected from a plurality of groups are displayed. For example, the user interface 102 displays the network data 228 and the customer data 230 associated with the "Great Corp. manufacturing computers" 626 group.

In box 812, a notice is optionally output when at least one of a set of user defined rules applied to a group is modified and ports defined by the set of rules are added to the network. For example, the user interface 102 outputs a notice to the salesman who sold the ports for the manufacturing computers 114 and 120 when the technician modifies the set of user defined rules applied to the "Great Corp. manufacturing computers" 626 group. In another example, the user interface 102 outputs a notice to the supervisor when the technician adds a port for the "Great Corp." 622 group.

In box 814, a group is optionally designated as favorite group that is accessible to a plurality of users. For example, the supervisor designates the "Great Corp." 622 group as a favorite group that is accessible to the salesman and to the technician.

In box 816, a plurality of users is optionally enabled to edit a favorite group. For example, the supervisor enables the salesman and the technician to edit the "Great Corp." 622 group.

In box 818, a plurality of users is optionally disabled from editing a favorite group. For example, the salesman disables the supervisor and the technician from editing the "Great Corp. manufacturing computers" 626 group because the salesman reserves the ability to edit the "Great Corp. manufacturing computers" 626 group for himself.

In box 820, the database manager optionally determines each customer link diversity for each customer based on the integrated database. The determined customer link diversity 318 may be the router diversity 320, the card diversity 322, the customer locations router diversity 324, and/or the customer locations card diversity 326. The determined customer link diversity 318 may identify potential problems for selected groups of ports. For example, because the "Great Corp. manufacturing computers" 626 group has one customer link between the first router 108 and the first manufacturing computer 114 and another customer link between the second router 110 and the second manufacturing computer 120, one of the manufacturing computers 114 and 120 still will be able to communicate even if either the first router 108 or the second router 110 fails. In another example, because the "Great Corp. distribution computers" 630 group has one customer link between the first router 108 and the first distribution computer 116 and another customer link between the first router 108 and the second distribution computer 118, neither of the distribution computers 116 and 118 will be able to communicate if the first router 108 fails.

The router diversity 320 is based on a number of customer links on each router. For example, FIG. 2A indicates that the "Great Corp." 622 group has a total of six customer links connecting customer computers to routers, one customer link between the routers 108-112 and each of the first manufacturing computer 114, the first distribution computer 116, the second distribution computer 118, the second manufacturing computer 120, the first sales computer 122, and the second sales computer 124.

In this example, the first manufacturing computer 114, the first distribution computer 116, and the second distribution computer 118 are all connected by customer links to the first router 108, resulting in a total of three customer links to the first router 108. Only one of the three customer links connected to the first router 108 is determined to be diverse because ideally each of these three customer links should be connected to a different router, not the same router, which results in a determined diversity of one customer link for the first router 108. Continuing this example, the second manufacturing computer 120 and the first sales computer 122 are both connected by customer links to the second router 110, resulting in a total of two customer links to the second router 110. Only one of the two customer links connected to the second router 110 is determined to be diverse because ideally both of these two customer links should be connected to a different router, not the same router, which results in a determined diversity of one customer link for the second router 110. Further to this example, the second sales computer 124 is connected by a customer link to the third router 112, resulting in a total of one customer link to the third router 112. The only customer link connected to the third router 112 is determined to be diverse because the only customer link is connected to one router, which results in a determined diversity of one customer link for the third router 112.

The router diversity 320 equals the total number of customer links determined to be diverse for the routers divided by the total number of customer links for the routers. For this example, one customer link is determined to be diverse for the first router 108, one customer link is determined to be diverse for the second router 110, and one customer link is determined to be diverse for the third router 112, which results in a total of three customer links determined to be diverse for the routers. Because the "Great Corp." 622 group has a total of three customer links determined to be diverse for the routers and a total of six customer links for the routers, three diverse links divided by six total links results in the router diversity 320 of 50% for the "Great Corp." 622 group.

In another example of router diversity 320, FIG. 2A indicates that the "Great Corp. manufacturing computers" 626 group has total of two customer links connecting customer computers to routers, one customer link between the routers 108-110 and each of the first manufacturing computer 114 and the second manufacturing computer 120. In this example, the first manufacturing computer 114 is connected by a customer link to the first router 108, resulting in a total of one customer link to the first router 108. The only customer link connected to the first router 108 is determined to be diverse because the only customer link is connected to one router, which results in a determined diversity of one customer link for the first router 108. Continuing this example, the second manufacturing computer 120 is connected by a customer link to the second router 110, resulting in a total of one customer link to the second router 110. The only customer link connected to the second router 110 is determined to be diverse because the only customer link is connected to one router, which results in a determined diversity of one customer link for the second router 110. For this example, one customer link is determined to be diverse for the first router 108, and one customer link is determined to be diverse for the second router 110, which results in a total of two customer links determined to be diverse for the routers. Because the "Great Corp. manufacturing computers" 626 group has a total of two customer links determined to be diverse for the routers and a total of two customer links for the routers, two diverse links divided by two total links results in the router diversity 320 of 100% for the "Great Corp. manufacturing computers" 626 group.

The card diversity 322 is based on a number of customer links on each card. Multiple customer links terminate on the same router for customers with a large number of customer links. Therefore, the card diversity 322 can improve through connecting customer links on different cards in the same router. For example, FIG. 2A indicates that the "Great Corp." 622 group has total of six customer links connecting customer computers to cards, one customer link between the cards 202-208 and each of the first manufacturing computer 114, the first distribution computer 116, the second distribution computer 118, the second manufacturing computer 120, the first sales computer 122, and the second sales computer 124.

In this example, the first manufacturing computer 114 and the first distribution computer 116 are connected by customer links to the first card 202, resulting in a total of two customer links to the first card 202. Only one of the two customer links connected to the first card 202 is determined to be diverse because ideally both of these customer links should be connected to a different card, not the same card, which results in a determined diversity of one customer link for the first card 202. Continuing this example, the second distribution computer 118 is connected by a customer link to the second card 204, resulting in a total of one customer link to the second card 204. The only customer link connected to the second card 204 is determined to be diverse because the only customer link is connected to one card, which results in a determined diversity of one customer link for the second card 204.

Further to this example, the second manufacturing computer 120 and the first sales computer 122 are both connected by customer links to the third card 206, resulting in a total of two customer links to the third card 206. Only one of the two customer links connected to the third card 206 is determined to be diverse because ideally both of these two customer links should be connected to a different card, not the same card, which results in a determined diversity of one customer link for the third card 206. Continuing this example, the second sales computer 124 is connected by a customer link to the fourth card 208, resulting in a total of one customer link to the fourth card 208. The only customer link connected to the fourth card 208 is determined to be diverse because the only customer link is connected to one card, which results in a determined diversity of one customer link for the fourth card 208.

The card diversity 322 equals the total number of customer links determined to be diverse for the cards divided by the total number of customer links for the cards. For example, one customer link is determined to be diverse for the first card 202, one customer link is determined to be diverse for the second card 204, one customer link is determined to be diverse for the third card 206, and one customer link is determined to be diverse for the fourth card 208, which results in a total of four customer links determined to be diverse for the cards. Because the "Great Corp." group has a total of four customer links determined to be diverse for the cards and a total of six customer links for the cards, four diverse links for the cards divided by six total links for the cards results in the card diversity 320 of 66.6% for the "Great Corp." group.

In another example of card diversity 322, FIG. 2A indicates that the "Great Corp. manufacturing center" 624 group has a total of two customer links connecting customer computers to cards, one customer link between the card 202 and each of the first manufacturing computer 114 and the first distribution computer 116. In this example, the first manufacturing computer 114 and the first distribution computer 116 are connected by customer links to the first card 202, resulting in a total of two customer links to the first card 202. Only one of the two customer links connected to the first card 202 is determined to be diverse because ideally both of these customer links should be connected to a different card, not the same card, which results in a determined diversity of one customer link for the first card 202. For this example, one customer link is determined to be diverse for the first card 202, which results in a total of one customer link determined to be diverse for the cards. Because the "Great Corp. manufacturing center" 624 group has a total of one customer link determined to be diverse for the cards and a total of two customer links for the cards, one diverse links for the cards divided by two total links for the cards results in the card diversity 320 of 50.0% for the "Great Corp. manufacturing center" 624 group. In this example, the lower percentage of 50% for the card diversity 320 indicates that the failure of one card, the first card 202, can cause the failure of multiple customer links, which can cause a communication failure for the manufacturing center 126.

The customer locations router diversity 324 is based on a number of customer links on each router to each specific location. By identifying the street addresses for the customer location 314, the database manager 226 can determine that a customer has more than one specific customer location in a city. A single specific customer location can have more than one customer link in an effort to improve reliability, i.e., to insure the customer location retains at least one customer link if any of the other customer location links fail. This effort may be for naught if all of the customer links for a specific customer location connect to the same router, because the failure of one router can cause the failure of multiple customer links. For example, because the manufacturing center 126 is connected by two links to the first router 108, only one of the manufacturing center 126 links is diverse. Because the distribution center 128 is connected by two links to different routers, the first router 108 and the second router 110, both of the distribution center 128 links are diverse. Because the sales center 130 is connected by two links to different routers, the second router 110 and the third router 112, both of the sales center 130 links are diverse.

The customer locations router diversity 324 equals the total number of customer location links determined to be diverse divided by the total number of customer location links. For example, one customer location link is determined to be diverse for the manufacturing center 126, two customer location links are determined to be diverse for the distribution center 128, and two customer location links are determined to be diverse for the sales center 130, which results in a total of five customer location links determined to be diverse. Because the "Great Corp." 622 group has a total of five customer location links determined to be diverse and a total of six customer location links, five diverse links divided by six total links results in the customer locations router diversity 324 of 83.3% for the "Great Corp." 622 group.

In another example of customer locations router diversity 324, because the sales center 130 is connected by two links to different routers, the second router 110 and the third router 112, both of the links for the "Great Corp. sales center" 632 group are diverse. For this example, two customer location links are determined to be diverse for the sales center 130, which results in a total of two customer location links determined to be diverse. Because the "Great Corp. sales center" 632 group has a total of two customer location links determined to be diverse and a total of two customer location links, two diverse links divided by two total links results in the customer locations router diversity 324 of 100.0% for the "Great Corp. sales center" 632 group.

The customer locations card diversity 326 is based on a number of customer links on each card to each specific location. For example, FIG. 2A indicates that the "Great Corp." 622 group has total of six customer links connecting customer computers to cards, one customer link between the cards 202-208 and each of the first manufacturing computer 114, the first distribution computer 116, the second distribution computer 118, the second manufacturing computer 120, the first sales computer 122, and the second sales computer 124.

The manufacturing center 126 is connected by two links, each to the first card 202. Ideally both of these two customer links from the manufacturing center 126 should be connected to a different card, but both of the customer links are connected to the same card, the first card 202. Only one of the customer links connected from the manufacturing center 126 is determined to be diverse.

Continuing this example, the distribution center 128 is connected by one link to the second card 204 and by one link to the third card 206. Both of the customer links connected from the distribution center 128 are determined to be diverse.

Further to this example, the sales center 130 is connected by one link to the third card 206 and by one link to the fourth card 208. Both of the customer links connected from the sales center 130 are determined to be diverse.

The customer locations card diversity 326 equals the total number of customer links determined to be diverse from each specific location to the cards divided by the total number of customer links. For example, one customer link is determined to be diverse for the manufacturing center 126 to the first card 202, two customer links are determined to be diverse for the distribution center 128 to the cards 204-206, and two customer links are determined to be diverse for the sales center 130 to the cards 206-208, which results in a total of five customer links determined to be diverse from each specific location to the cards. Because the "Great Corp." 622 group has a total of five customer links determined to be diverse from each specific location to the cards and a total of six customer links, five diverse links divided by six total links results in the customer locations card diversity 324 of 83.3%.

In another example of customer locations card diversity 326, FIG. 2A indicates that the "Great Corp. manufacturing center" 624 group has total of two customer links connecting customer computers to cards, one customer link between the card 202 and each of the first manufacturing computer 114 and the first distribution computer 116. The "Great Corp. manufacturing center" 624 group is connected by two links, each to the first card 202. Ideally both of these two customer links for the "Great Corp. manufacturing center" 624 group should be connected to a different card, but both of the customer links are connected to the same card, the first card 202. Only one of the customer links connected from the manufacturing center 126 is determined to be diverse. For this example, one customer link is determined to be diverse for the "Great Corp. manufacturing center" 624 group to the first card 202, which results in a total of one customer link determined to be diverse for the "Great Corp. manufacturing center" 624 group to the cards. Because the "Great Corp. manufacturing center" 624 group has a total of one customer link determined to be diverse to the cards and a total of two customer links, one diverse link divided by two total links results in the customer locations card diversity 324 of 50.0% for the "Great Corp. manufacturing center" 624 group. In this example, the lower percentage of 50% for the customer locations card diversity 326 indicates that the failure of one card, the first card 202, can cause the failure of multiple customer links, which can cause a communication failure for the manufacturing center 126.

The target customer link diversities 328 is a set of threshold customer link diversities that correspond to each of the customer link diversities that can be determined. For example, the integrated database 232 can include individual target customer link diversities 328 that correspond to each of the router diversity 320, the card diversity 322, the customer locations router diversity 324, and the customer locations card diversity 326 for the "Great Corp." 622 group. Continuing this example, Great Gadgets Corporation can specify a target customer link diversity of 50% for the router diversity 320, a target customer link diversity of 50% for the card diversity 322, a target customer link diversity of 90% for the customer locations card diversity 326, and no target customer link diversity for the customer locations router diversity 324. Each customer can specify their own target customer link diversities 328 based on the requirements for the customer. The higher that a customer sets their own target customer link diversities 328, the more changes may need to be made to meet the high target customer link diversities 328, changes that may generate additional expenses for the customer. Each customer can decide how important each type of customer link diversity 318 is for the customer and how much the customer may be willing to pay for maintaining the customer link diversity 318, and then set their own target customer link diversities 328 accordingly. Alternatively, a network service provider may evaluate each type of customer link diversity 318 for a customer and reassign customer links as new network devices are added to the network. The target customer link diversities 328 can be entered into the integrated database for each customer by the customer or by the user of the customer link diversity monitoring system 100.

In box 822, the database manager optionally displays each customer link diversity for a customer specified through the user interface. A user can instruct the database manager 226 to determine a specific customer link diversity 318 for a specific customer. For example, the user interface 102 displays the customer locations card diversity 326 of 83.3% for the "Great Corp." 622 group to the supervisor.

In box 824, the database manager optionally recommends a reassignment of a customer link when the customer link diversity is less than the target customer link diversity. For example, the customer locations card diversity 326 of 83.3% for the "Great Corp." 622 group is less than the corresponding target customer link diversity 328 of 90% for the "Great Corp." 622 group. The database manager 226 also may evaluate the customer locations card diversity 326 for the "Great Corp." 622 group based on potential reassignments of a customer link for the "Great Corp." 622 group.

For example, the database manager 226 evaluates the potential reassignment of the customer link for the first distribution computer 116 from the second port 212 on the first card 202 on the first router 108 to the third port 214 on the second card 204 on the first router 108. Continuing this example, the customer links from the manufacturing center 126 are customer links to the first card 202 and the second card 204. Both of these customer links connected to the manufacturing center 126 are now determined to be diverse because the customer links from the manufacturing center 126 are each connected to a different card.

Further to this example, the potential reassignment of the customer link from the first distribution computer 116 from the second port 210 on the first card 202 on the first router 108 to the third port 214 on the second card 204 on the first router has no effect on the customer locations card diversity 326 for the distribution center 128 or the sales center 130.

Therefore, two customer links are determined to be diverse from the manufacturing center 126 to the cards 202-204, two customer links are determined to be diverse for the distribution center 128 to the cards 204-206, and two customer links are determined to be diverse for the sales center 130 to the cards 206-208, which results in a total of six customer links determined to be diverse from each specific location to the cards. Because the "Great Corp." 622 group has a total of six customer links determined to be diverse from each specific location to the cards and a total of six customer links, six diverse links divided by six total links results in the customer locations card diversity 324 of 100.0% for the "Great Corp." 622 group.

The evaluation of the potential reassignment of the customer link for the first distribution computer 116 determines that the customer locations card diversity 326 of 83.3% for the "Great Corp." 622 group can be increased above the target customer link diversities 328 of 90% that corresponds to the customer locations card diversity 326 for the "Great Corp." 622 group. Therefore, the database manager 226 recommends a reassignment of a customer link for the first distribution computer 116. The database manager 226 recommends that a technician unplug the link for the first distribution computer 116 from the second port 212 on the first card 202 on the first router 108 and plug the link for the first distribution computer 116 to the third port 214 on the second card 204 on the first router 108. This reassignment results in each customer link diversity 318 for the "Great Corp." 622 group exceeding the corresponding target customer link diversities 328 for the "Great Corp." group.

Because the customer link diversity monitoring is ongoing, as the method is repeated periodically, each customer link diversity 318 is automatically updated when the network 106 changes, e.g., when cards are added or when new links are added or removed. The database manager 226 determines the customer link diversity 318 when adding a card and determines the customer link diversity 318 when adding a customer link. A user of the system 100 can instruct the database manager 226 to determine each customer link diversity 318 for each of the user's favorite groups. For example, the database manager 226 determines the card diversity 322 for each group when adding a card to the first router 108. In another example, the database manager 226 determines the router diversity 322 for the "Great Corp." 622 group when adding a customer link for another customer computer in the manufacturing center 126. The database manager 226 enables the system 100 to monitor customer link diversity 318 periodically, as customers add customer links and as network service providers add cards and routers to their networks. As the customer link diversity 318 changes for groups, the system 100 recommends reassignment of customer links when a changed customer link diversity 318 is below a target customer link diversity 328 specified by a customer. The system 100 can output a recommendation for a reassignment of a customer link if the reassignment can increase the customer link diversity 318 for a group, or output a notice that current potential reassignments would not increase the customer link diversity 318 for the group.

The grouping feature disclosed above and described in the context of determining a variety of diversity metrics may be applied to other uses. In an embodiment, the flexible grouping for port analysis may be used to feed the results of grouping port analysis to other applications, for example to network utilization analysis applications, log analysis applications, inventory management applications, network management applications, and other applications. The data within these applications may then be segmented by the flexible port groupings. The groups can be exported out of a primary grouping database, populated with port grouping data, in a format that is suitable for use by the subject applications. The several applications are integrated with the flexible grouping feature so that the data in these applications is updated automatically, thereby keeping the ports grouping data employed by these applications synchronized with the primary grouping database. In some embodiments, some applications may already have a restricted and static view of the port grouping data, but it is herein contemplated to integrate these applications with the presently disclosed grouping feature to promote automatic updating of the port grouping data and thereby make this information and the use thereof by the applications dynamic.

Figure 9:
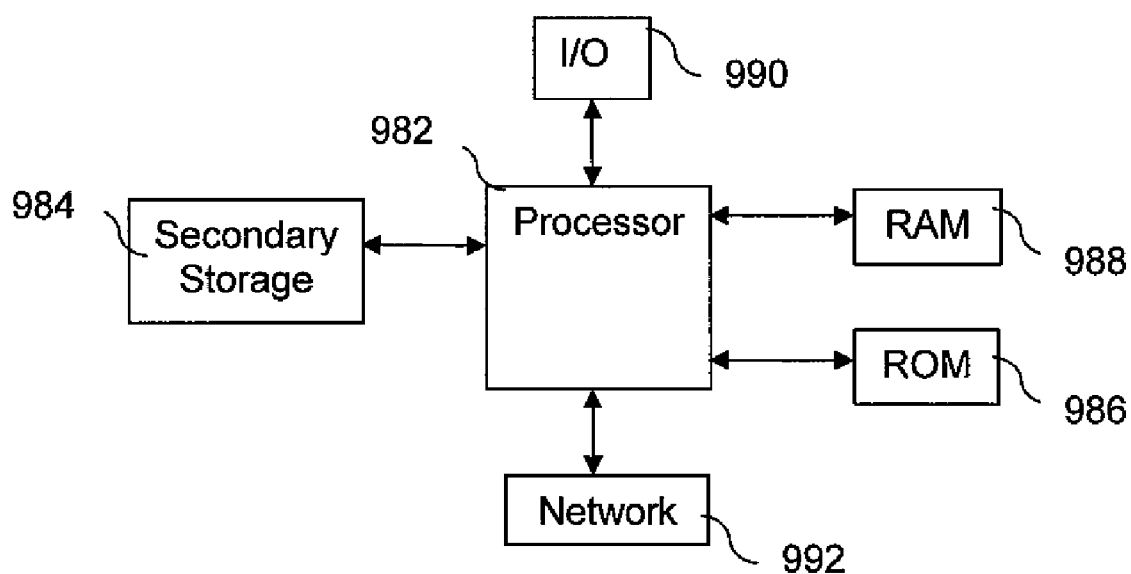
FIG. 9 shows a block diagram of an illustrative server for flexible grouping for port analysis according to some embodiments of the present disclosure.

The system described above may be implemented on any general-purpose computer with sufficient processing power, memory resources, and network throughput capability to handle the necessary workload placed upon it. FIG. 9 illustrates a typical, general-purpose computer system suitable for implementing one or more embodiments disclosed herein. The computer system 980 includes a processor 982 (which may be referred to as a central processor unit or CPU) that is in communication with memory devices including secondary storage 984, read only memory (ROM) 986, random access memory (RAM) 988, input/output (I/O) devices 990, and network connectivity devices 992. The processor may be implemented as one or more CPU chips.

The secondary storage 984 is typically comprised of one or more disk drives or tape drives and is used for non-volatile storage of data and as an over-flow data storage device if RAM 988 is not large enough to hold all working data. Secondary storage 984 may be used to store programs which are loaded into RAM 988 when such programs are selected for execution. The ROM 986 is used to store instructions and perhaps data which are read during program execution. ROM 986 is a non-volatile memory device which typically has a small memory capacity relative to the larger memory capacity of secondary storage. The RAM 988 is used to store volatile data and perhaps store instructions. Access to both ROM 986 and RAM 988 is typically faster than to secondary storage 984.

I/O devices 990 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 992 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 992 may enable the processor 982 to communicate with an Internet or one or more intranets. With such a network connection, it is contemplated that the processor 982 might receive information from the network, or might output information to the network in the course of performing the above-described method steps. Such information, which is often represented as a sequence of instructions to be executed using processor 982, may be received from and outputted to the network, for example, in the form of a computer data signal embodied in a carrier wave Such information, which may include data or instructions to be executed using processor 982 for example, may be received from and outputted to the network, for example, in the form of a computer data baseband signal or signal embodied in a carrier wave. The baseband signal or signal embodied in the carrier wave generated by the network connectivity devices 992 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 982 executes instructions, codes, computer programs, scripts which it accesses from hard disk, floppy disk, optical disk (these various disk based systems may all be considered secondary storage 984), ROM 986, RAM 988, or the network connectivity devices 992. While only one processor 982 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A computer implemented method for flexible grouping for port analysis, comprising:

parsing router configurations to create port data for each port on each router in a service provider network, wherein the port data for each port on each router includes a customer name;

integrating the port data with customer data to create an integrated database, wherein each customer data is associated with one of a plurality of customers, and wherein the integrating comprises matching the customer name included in the port data for each port to a corresponding one of the plurality of customers associated with each customer data;

assigning a plurality of ports to a plurality of groups for one of the plurality of customers in the integrated database based on applying a set of user defined rules, wherein at least one of the plurality of ports is assigned to multiple groups, wherein each rule of the set of user defined rules specifies particular customer data, particular port data, or a particular combination of customer data and port data, and wherein some of the plurality of ports are assigned to one of the plurality of groups based on the some of the plurality of ports having the particular customer data, the particular port data, or the particular combination of customer data and port data specified in a corresponding one of the set of user defined rules for the one of the plurality of groups; and displaying port data and customer data associated with a group selected from the plurality of groups.

2. The computer implemented method of claim 1, further comprising parsing router configurations to create the port data for each port on each router in a plurality of service provider networks.

3. The computer implemented method of claim 1, further comprising retrieving the router configurations from data stores for routers in the service provider network.

4. The computer implemented method of claim 1, wherein applying the set of user defined rules assigns a port to the group if each rule of the set of rules applies to the port or if one of the set of rules applies to the port.

5. The computer implemented method of claim 1, wherein applying the set of user defined rules comprises identifying ports for exclusion from the group.

6. The computer implemented method of claim 1, further comprising outputting a notice when at least one of the set of user defined rules applied to the group is modified and ports defined by the set of user defined rules are added to a network.

7. The computer implemented method of claim 1, further comprising designating the group as a favorite group that is accessible to a plurality of users.

8. The computer implemented method of claim 7, further comprising enabling the plurality of users to edit the favorite group.

9. The computer implemented method of claim 7, further comprising disabling the plurality of users from editing the favorite group.

10. The computer implemented method of claim 1, wherein the plurality of groups are dynamic by applying the set of user defined rules when the set of user defined rules are defined and when at least one of the port data and the customer data changes.

11. A system for flexible grouping for port analysis, comprising:
    a data retriever stored on a non-transitory computer readable medium and executable by a processor to retrieve router configurations from data stores for routers in a service provider network;
    a database manager stored on a non-transitory computer readable medium and executable by a processor to parse the router configurations to create port data for each port on each router in the service provider network, wherein the port data for each port on each router includes a customer name, to integrate the data with customer data to create an integrated database, wherein each customer data is associated with one of a plurality of customers, and wherein the integrating comprises matching the customer name included in the port data for each port to a corresponding one of the plurality of customers associated with each customer data, and to assign a plurality of ports to a plurality of groups for one of the plurality of customers in the integrated database based on applying a set of user defined rules, wherein at least one of the plurality of ports is assigned to multiple groups, wherein each rule of the set of user defined rules specifies particular customer data, particular port data, or a particular combination of customer data and port data, and wherein some of the plurality of ports are assigned to one of the plurality of groups based on the some of the plurality of ports having the particular customer data, the particular port data, or the particular combination of customer data and port data specified in a corresponding one of the set of user defined rules for the one of the plurality of groups; and
    a user interface to display port data and customer data associated with a group selected from the plurality of groups.

12. The system of claim 11, wherein the port data comprises port bandwidth, status, configuration, and data output.

13. The system of claim 11, wherein the set of user defined rules is based on at least one of a customer full name, a customer short name, a remote side internet protocol address, a network address number, a private line number, an interface description, a remote border gateway protocol autonomous system number, a router and interface name, a support office indicator code, and a multiprotocol label switching virtual routing and forwarding number.

14. The system of claim 11, wherein the set of user defined rules is based on a user identification of individual ports, wherein the system creates a rule that corresponds to the individual ports.

15. A computer implemented method for flexible grouping for port analysis, comprising:
    parsing router configurations to determine port data for each port on each router in a service provider network, wherein the port data for each port on each router includes a customer name;
    integrating the port data with customer data to create an integrated database, wherein each customer data is associated with one of a plurality of customers, and wherein the integrating comprises matching the customer name included in the port data for each port to a corresponding one of the plurality of customers associated with each customer data;
    assigning a plurality of ports to a plurality of groups for one of the plurality of customers in the integrated database based on applying a set of user defined rules, wherein at least one of the plurality of ports is assigned to multiple groups, wherein each rule of the set of user defined rules specifies particular customer data, particular port data, or a particular combination of customer data and port data, and wherein some of the plurality of ports are assigned to one of the plurality of groups based on the some of the plurality of ports having the particular customer data, the particular port data, or the particular combination of customer data and port data specified in a corresponding one of the set of user defined rules for the one of the plurality of groups;
    determining a customer link diversity for a group selected from the plurality of groups based on the integrated database, wherein the customer link diversity is a proportion indicating how much of the one of the plurality of customers' communication service is diversified among different access points to the service provider network; and
    displaying the customer link diversity.

16. The computer implemented method of claim 15, further comprising recommending reassignment of a customer link when the customer link diversity is less than a corresponding target customer link diversity.

17. The computer implemented method of claim 15, wherein the customer link diversity comprises a router diversity based on a number of customer links on each router.

18. The computer implemented method of claim 15, wherein the customer link diversity comprises a card diversity based on a number of customer links on each card.

19. The computer implemented method of claim 15, wherein the customer link diversity comprises a customer locations router diversity based on a number of customer links on each router to each location.

20. The computer implemented method of claim 15, wherein the customer link diversity comprises a customer locations card diversity based on a number of customer links on each card to each location.

21. The computer implemented method of claim 15, further comprising determining the customer link diversity when adding a card and determining the customer link diversity when adding a customer link.

* * * * *